United States Patent
Assali et al.

(10) Patent No.: US 9,823,817 B1
(45) Date of Patent: Nov. 21, 2017

(54) METHODS, SYSTEMS, AND MEDIA FOR ASSOCIATING SCENES DEPICTED IN MEDIA CONTENT WITH A MAP OF WHERE THE MEDIA CONTENT WAS PRODUCED

(71) Applicant: Google Inc., Mountain View, CA (US)

(72) Inventors: Cinthia Rodrigues Abou Assali, Paris (FR); Nayeli Rodriguez, Paris (FR); Jonathan Becquemin, Paris (FR); Leon Bayliss, London (GB); Gregory Blay-Desforges, Paris (FR)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 14/720,297

(22) Filed: May 22, 2015

(51) Int. Cl.
  *G06F 3/048* (2013.01)
  *G06F 3/0482* (2013.01)
  *G06F 17/30* (2006.01)
  *G06F 3/0484* (2013.01)

(52) U.S. Cl.
  CPC ........ *G06F 3/0482* (2013.01); *G06F 3/04842* (2013.01); *G06F 17/3082* (2013.01)

(58) Field of Classification Search
  CPC ....................................................... H04N 5/91
  See application file for complete search history.

(56) References Cited

U.S. PATENT DOCUMENTS

2014/0301715 A1\* 10/2014 Prat .................... H04N 21/4104
  386/241

\* cited by examiner

*Primary Examiner* — Peiyong Weng
(74) *Attorney, Agent, or Firm* — Byrne Poh LLP

(57) ABSTRACT

Methods, systems, and media for associating scenes depicted in media content with a map of where the media content was produced are provided. In some embodiments, a method for presenting map information with video information is provided, the method comprising: receiving a request for a video from a user device; determining if there is location information associated with portions of the video; in response to determining that there is location information associated with the video, causing first map information corresponding to the location information to be presented in a first format during presentation of the video; receiving an indication that the first map information has been selected; in response to receiving the indication, causing second map information corresponding to the portion of the video that was being presented to be presented by the user device, wherein the second map information is presented in a second format.

17 Claims, 7 Drawing Sheets

US 9,823,817 B1

METHODS, SYSTEMS, AND MEDIA FOR ASSOCIATING SCENES DEPICTED IN MEDIA CONTENT WITH A MAP OF WHERE THE MEDIA CONTENT WAS PRODUCED

TECHNICAL FIELD

The disclosed subject matter relates to methods, systems, and media for associating scenes depicted in media content with a map of where the media content was produced.

BACKGROUND

Consumers interested in particular media content may be interested in learning more about the locations where the media content was created. For example, certain locations where popular movies or television shows were produced have become tourist attractions. However, in order to determine where content was produced, a consumer needs to use a separate service, such as a search engine, to try to locate information about the media content. This can be frustrating for the consumer as they may have to sift through many results that are not relevant, or may not be able to easily access the information at all.

Accordingly, it is desirable to provide methods, systems, and media for associating scenes depicted in media content with a map of where the media content was produced.

SUMMARY

In accordance with various embodiments of the disclosed subject matter, methods, systems, and media for associating scenes depicted in media content with a map of where the media content was produced are provided.

In accordance with some embodiments of the disclosed subject matter, a method for presenting map information with video information is provided, the method comprising: receiving, using a hardware processor, a request for a video from a user device; determining if there is location information associated with one or more portions of the video; in response to determining that there is location information associated with one or more portions of the video, causing first map information corresponding to the location information to be presented in a first format during presentation of the video; receiving an indication that the first map information has been selected; in response to receiving the indication that the first map information has been selected, causing second map information to be presented by the user device such that the location information corresponding to the portion of the video that was being presented when the indication was received is include in the second map information, wherein the second map information is presented in a second format that is different than the first format.

In accordance with some embodiments of the disclosed subject matter, a system for presenting map information with video information is provided, the system comprising: a hardware processor that is programmed to: receive a request for a video from a user device; determine if there is location information associated with one or more portions of the video; in response to determining that there is location information associated with one or more portions of the video, cause first map information corresponding to the location information to be presented in a first format during presentation of the video; receive an indication that the first map information has been selected; in response to receiving the indication that the first map information has been selected, cause second map information to be presented by the user device such that the location information corresponding to the portion of the video that was being presented when the indication was received is include in the second map information, wherein the second map information is presented in a second format that is different than the first format.

In accordance with some embodiments of the disclosed subject matter, a non-transitory computer-readable medium containing computer executable instructions that, when executed by a processor, cause the processor to perform a method for presenting map information with video information is provided, the method comprising: receiving a request for a video from a user device; determining if there is location information associated with one or more portions of the video; in response to determining that there is location information associated with one or more portions of the video, causing first map information corresponding to the location information to be presented in a first format during presentation of the video; receiving an indication that the first map information has been selected; in response to receiving the indication that the first map information has been selected, causing second map information to be presented by the user device such that the location information corresponding to the portion of the video that was being presented when the indication was received is include in the second map information, wherein the second map information is presented in a second format that is different than the first format.

In accordance with some embodiments of the disclosed subject matter, a system for presenting map information with video information is provided, the system comprising: means for receiving a request for a video from a user device; means for determining if there is location information associated with one or more portions of the video; means, responsive to the means for determining that there is location information associated with one or more portions of the video, for causing first map information corresponding to the location information to be presented in a first format during presentation of the video; means for receiving an indication that the first map information has been selected; means, responsive to the means for receiving the indication that the first map information has been selected, for causing second map information to be presented by the user device such that the location information corresponding to the portion of the video that was being presented when the indication was received is include in the second map information, wherein the second map information is presented in a second format that is different than the first format.

In some embodiments, the location information is stored in a database, and wherein the method further comprises querying the database for location information associated with the video.

In some embodiments, the first map information is a portion of a street map that includes a representation of an area corresponding to the location information.

In some embodiments, the first map information is an image captured near ground level that depicts at least a portion of an area corresponding to the location information.

In some embodiments, the means for causing the first map information to be presented during presentation of the video comprises means for causing the first map information to be presented in a user interface area adjacent to a user interface area used to present the video.

In some embodiments, the means for causing the first map information to be presented during presentation of the video comprises means for causing the first map information to be presented in a user interface area that overlaps at least a portion of a user interface area used to present the video.

In some embodiments, the system further comprises means for causing the first map information to change during presentation of the video to reflect location information associated with a portion of the video that is currently being presented.

In some embodiments, the second map information corresponds to the first map information that was being presented when the indication that the first map information was selected was received.

In some embodiments, the system further comprises means for inhibiting presentation of the first map information during portions of the video that are not associated with location information.

In accordance with some embodiments of the disclosed subject matter, a method for presenting media content associated with map information is provided, the method comprising: receiving, using a hardware processor, a request for map information that represents an area; determining that one or more videos of a plurality of videos are associated with location information corresponding to the area for which map information was requested; in response to determining that the one or more videos are associated with location information corresponding to the area for which map information was requested, causing a representation of a first video of the one or more videos to be presented within the map information at a first location corresponding to the location information associated with the first video; receiving an indication that the representation of the first video has been selected; and in response to receiving the indication that the first video has been selected, causing the first video to be presented beginning at a portion of the video that includes a depiction of the first location.

In accordance with some embodiments of the disclosed subject matter, a system for presenting media content associated with map information is provided, the system comprising: a hardware processor that is programmed to: receive a request for map information that represents an area; determine that one or more videos of a plurality of videos are associated with location information corresponding to the area for which map information was requested; in response to determining that the one or more videos are associated with location information corresponding to the area for which map information was requested, cause a representation of a first video of the one or more videos to be presented within the map information at a first location corresponding to the location information associated with the first video; receive an indication that the representation of the first video has been selected; and in response to receiving the indication that the first video has been selected, cause the first video to be presented beginning at a portion of the video that includes a depiction of the first location.

In accordance with some embodiments of the disclosed subject matter, a non-transitory computer-readable medium containing computer executable instructions that, when executed by a processor, cause the processor to perform a method for presenting media content associated with map information is provided, the method comprising: receiving a request for map information that represents an area; determining that one or more videos of a plurality of videos are associated with location information corresponding to the area for which map information was requested; in response to determining that the one or more videos are associated with location information corresponding to the area for which map information was requested, causing a representation of a first video of the one or more videos to be presented within the map information at a first location corresponding to the location information associated with the first video; receiving an indication that the representation of the first video has been selected; and in response to receiving the indication that the first video has been selected, causing the first video to be presented beginning at a portion of the video that includes a depiction of the first location.

In accordance with some embodiments of the disclosed subject matter, a system for presenting media content associated with map information is provided, the system comprising: means for receiving a request for map information that represents an area; means for determining that one or more videos of a plurality of videos are associated with location information corresponding to the area for which map information was requested; means, responsive to the means for determining that the one or more videos are associated with location information corresponding to the area for which map information was requested, for causing a representation of a first video of the one or more videos to be presented within the map information at a first location corresponding to the location information associated with the first video; means for receiving an indication that the representation of the first video has been selected; and means, responsive to the means for receiving the indication that the first video has been selected, for causing the first video to be presented beginning at a portion of the video that includes a depiction of the first location.

In some embodiments, the means for determining that one or more videos of the plurality of videos are associated with location information corresponding to the area for which map information was requested comprises means for determining that a first group of videos of the plurality of videos are associated with the location information corresponding to the area for which map information was requested, wherein the system further comprises: means for selecting a second group of videos from the first group of videos for which a representation is to be presented within the map information; and means for causing representation information of each video of the second group of videos to be presented within the map information at a location corresponding to the location information associated with the video of the second group of videos.

In some embodiments, the means for selecting the second group of videos comprises means for selecting the second group of videos based on the relevance of each video of the first group of videos to a user associated with the user device, wherein the relevance is based at least in part on user preferences of the user.

In some embodiments, the means for selecting the second group of videos comprises means for selecting the second group of videos comprises selecting the second group of videos based on the relevance of each video of the first group of videos to a user associated with the user device, wherein the relevance is based at least in part on whether the user is a social connection of a user associated with the video.

In some embodiments, the means for selecting the second group of videos comprises means for selecting the second group of videos comprises selecting the second group of videos based on whether the each video in the first group of videos is accessible by a user associated with the user device, wherein videos that are not accessible to the user are not selected for inclusion in the second group.

In some embodiments, the system further comprises: means for receiving a request for map information that represents a second area that is different than the area for which map information was requested; means for determining that a group of videos of the plurality of videos are associated with location information corresponding to the second area; and means, responsive to the means for determining that the group of videos are associated with location information corresponding to the second area, for causing a representation of a second video of the group of videos to be presented within the map information at a second location corresponding to the location information associated with the second video.

In some embodiments, the request for map information that represents the second area comprises a request to zoom out from the area for which map information was requested.

In some embodiments, the request for map information that represents the second area comprises a request to move the area represented by the map information from the area for which map information was requested.

In some embodiments, the representation of the first video includes an image that represents a portion of the first video that was captured near the first location.

In some embodiments, the representation of the first video includes descriptive information of the first video.

In some embodiments, the means for determining that one or more videos of a plurality of videos are associated with location information corresponding to the area for which map information was requested comprises: means for querying a database that includes location information associated with videos for location information that corresponds to locations represented in the area for which map information was requested; and means, responsive to the means for querying the database, for receiving identifying information of the one or more videos.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and/or media) for associating scenes depicted in media content with a map of where the media content was produced are provided.

In some embodiments, the mechanisms described herein can associate location information that corresponds to locations in media content with the media content. For example, if a scene in a video was captured in a certain location (e.g., a particular area in New York City), the mechanisms described herein can associate the location with at least a part of that scene.

In some embodiments, the mechanisms described herein can receive a request for one or more media content items, such as videos, and/or any other suitable content items, from a user device, and can determine if one or more portions of the requested content item is associated with location information. For example, the mechanisms described herein can receive a request for a particular video, and can determine if any portion of the requested video is associated with location information (e.g., a particular area in New York).

In some embodiments, if location information is associated with a requested video, the mechanisms described herein can cause map information that represents the location specified by the location information to be presented during presentation of a relevant part of the media content item. For example, if location information specifying a particular area in New York is associated with a portion of a requested video, the mechanisms described herein can present a street map and/or images of the specified area during presentation of the video.

Additionally, in some embodiments, the mechanisms described herein can add representations of media content having association location information to map information when a user device requests map information corresponding to the associated location information. For example, if the mechanisms described herein receive a request for a map of a particular area in New York, the mechanisms described herein can determine if there are any videos that are associated with location information corresponding to that area in New York. In such an example, in response to the request for the map of the area of New York, the mechanisms can insert one or more representations of videos that are associated with location information indicating that the video portrays an area included in the map.

Figure 1:
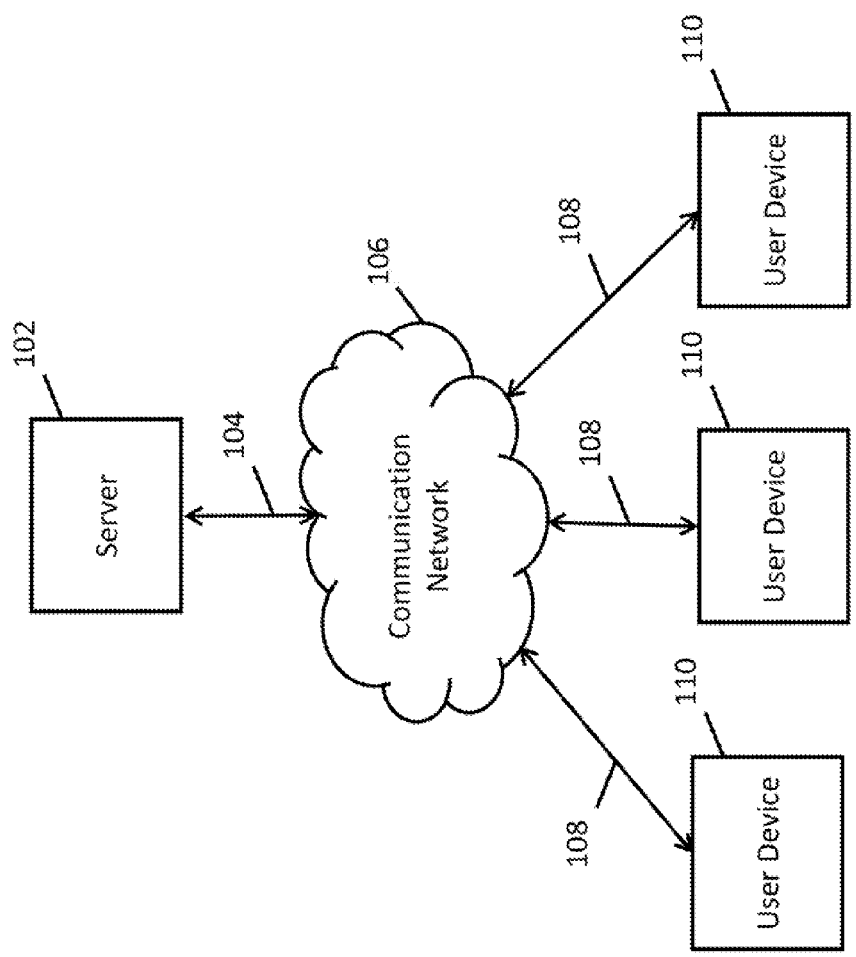
FIG. 1 shows an example of a generalized schematic diagram of a system on which the mechanisms for associating scenes depicted in media content with a map of where the media content was produced as described herein can be implemented in accordance with some embodiments of the disclosed subject matter.

FIG. 1 shows an example 100 of a generalized schematic diagram of a system on which the mechanisms for associating scenes depicted in media content with a map of where the media content was produced as described herein can be implemented in accordance with some embodiments of the disclosed subject matter. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for associating scenes depicted in media content with a map of where the media content was produced, such as a processor, a computer, a data processing device, or any suitable combination of such devices. For example, the mechanisms for associating scenes depicted in media content with a map of where the media content was produced can be distributed into multiple backend components and multiple frontend components and/or user interfaces. In a more particular example, backend components, such as mechanisms for receiving media content items, receiving requests for one or more media content items, transmitting media content items, receiving location data, receiving requests for map data, saving location information in association with a media content item, providing linked map data when presenting media content items based on the saved location information, providing links to media content items when presenting map data based on the saved location information, etc., can be performed on one or more servers 102. In another more particular example, frontend components, such as presentation of a user interface, initiating requests for media content items, initiating requests for map data, presenting media content items, presenting map information, etc., can be performed on one or more user devices 110.

In some embodiments, each of user devices 110, and server 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a smartphone, a tablet computer, a mobile telephone, a wearable computer, a vehicle (e.g., an automobile, a boat, an airplane, or any other suitable vehicle) entertainment system (e.g., a radio, a built-in display, etc.), a personal computer, a laptop computer, a digital media receiver, a set-top box, a smart television, a home entertainment system, a game console, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110 and server 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for associating scenes depicted in media content with a map of where the media content was produced. For example, system 100 can include a content discovery server 102 that facilitates discovery of media content available from a content platform using the mechanisms described herein, a content delivery server 102 that responds to requests for a media content item by causing the requested media content item to be transmitted to user device 110 that requested the content, a map server 102 that responds to requests for map data by causing the requested map data to be transmitted to and/or presented by user device 110 that requested the content, an information server 102 that stores location information for media content items and/or correlations between location information in media content items with locations in the map data, and/or any other suitable servers for performing any suitable functions of the mechanisms described herein and/or any other suitable functions.

Figure 2:
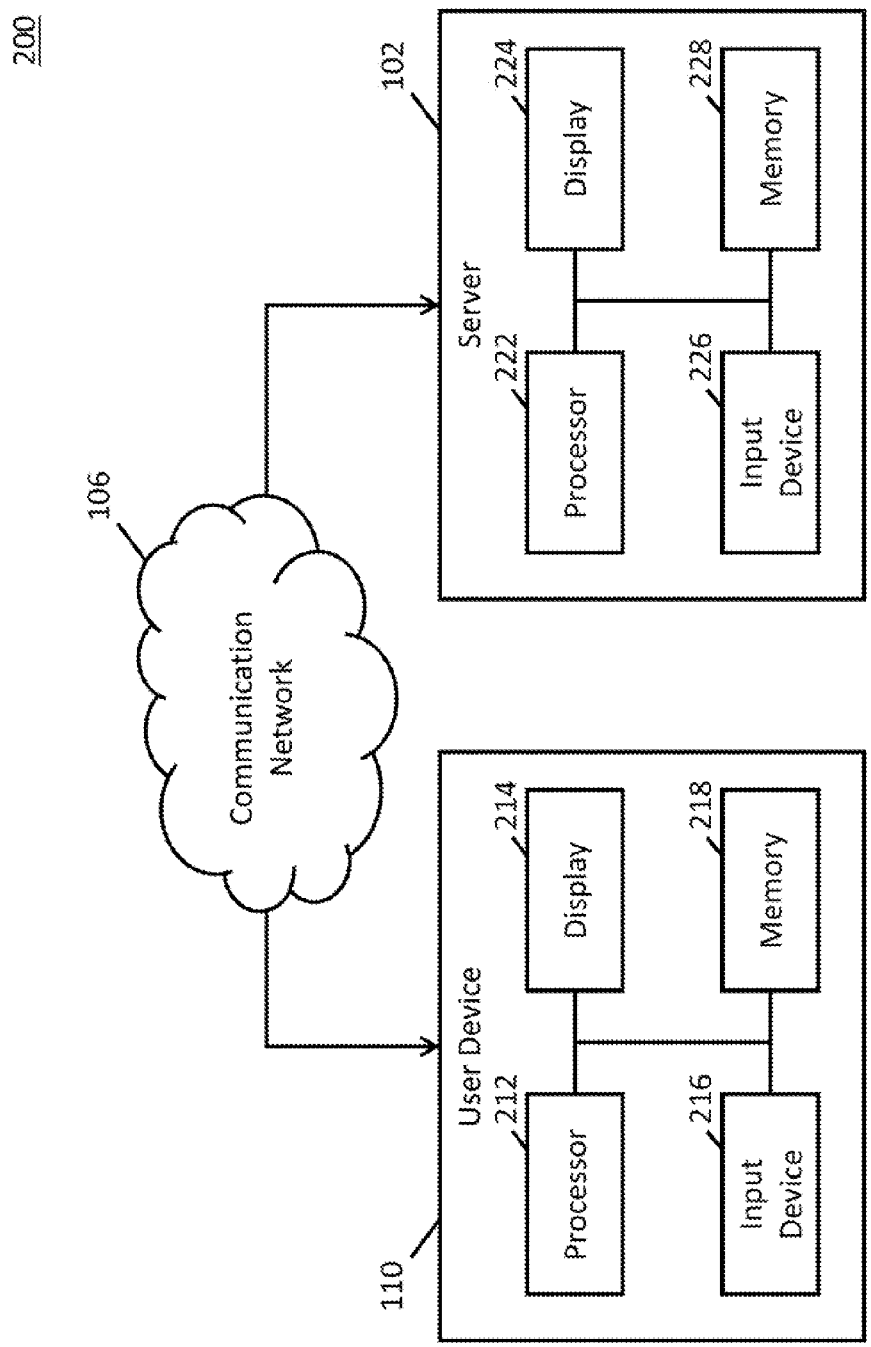
FIG. 2 shows an example of hardware that can be used to implement one or more user devices and servers depicted in FIG. 1 in accordance with some embodiments of the disclosed subject matter.

FIG. 2 shows an example 200 of hardware that can be used to implement one or more of user devices 110, and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for initiating requests for media content items, initiating requests for map information, presenting media content items, presenting map information, recording media content items, uploading media content items, recording location data, sending and receiving data through communications link 108, and/or for performing any other suitable task associated with the mechanisms described herein. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, a camera, a microphone, and/or any other suitable input device.

Server 102 can include a hardware processor 222, a display 224, an input device 226, and memory 228, which can be interconnected. In some embodiments, memory 228 can include a storage device (such as a non-transitory computer-readable medium) for storing data received through communications link 104 or through other links. The storage device can further include a server program for controlling hardware processor 222. In some embodiments, memory 228 can include information stored as a result of user activity (e.g., submission of location data, editing of location information, etc.), and hardware processor 222 can receive media content and associate the media content with location information (e.g., as described below in connection with process 300 of FIG. 3), receive requests for media content from user devices 110 and transmit the requested media content to be presented by user device 110 in association with location information for that media content (e.g., as described below in connection with process 400 of FIG. 4), receive requests for map information from user devices 110 and transmit the requested map information to be presented by user device 110 in association with media content having location information corresponding to the requested map information (e.g., as described below in connection with process 500 of FIG. 5). In some embodiments, the server program can cause hardware processor 222 to, for example, execute one or more portions of processes 300, 400 and 500 as described below in connection with FIGS. 3-5.

Hardware processor 222 can use the server program to communicate with user devices 110 as well as provide access to and/or copies of the mechanisms described herein. It should also be noted that data received through communications link 104 or any other communications links can be received from any suitable source. In some embodiments, hardware processor 222 can send and receive data through communications link 104 or any other communications links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for providing video content suitable for audio-only playback. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, a camera, a microphone, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Figure 3:
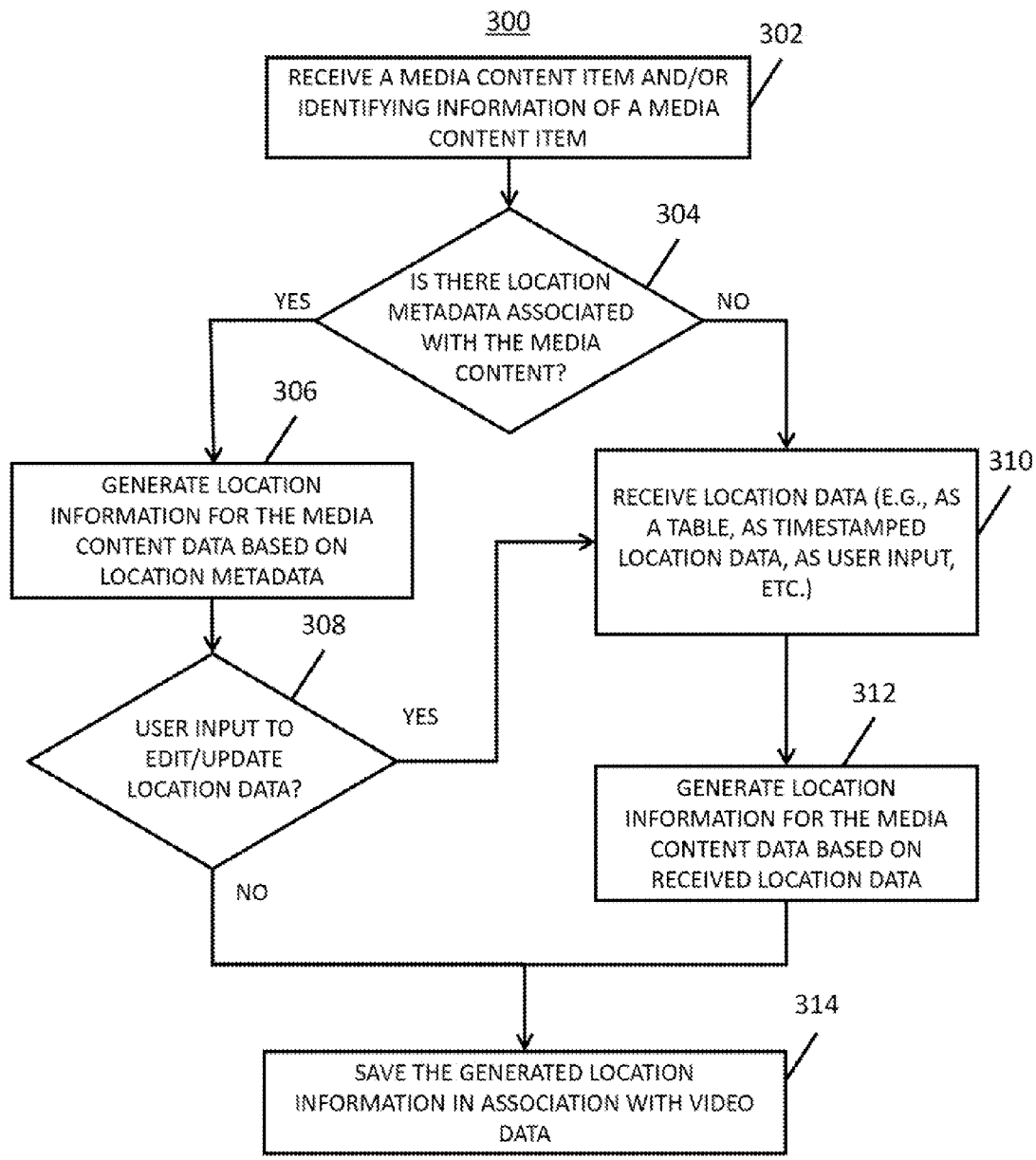
FIG. 3 shows an example of a process for associating scenes depicted in media content with a map of where the media content was produced in accordance with some embodiments of the disclosed subject matter.

Turning to FIG. 3, an example 300 of a process for associating scenes depicted in media content with a map of where the media content was produced is shown in accordance with some embodiments of the disclosed subject matter. At 302, process 300 can receive a media content item and/or identifying information of a media content item. In some embodiments, the media content item can include any suitable media content such as audio, video, still images, text, etc. For example, the content item can be a user generated video, a professionally produced movie, a slideshow of images, a web page, an electronic book, etc. In some embodiments, the media content item can be received using any suitable technique or combination of techniques. For example, the media content item can be uploaded by a user device which may or may not have recorded and/or otherwise generated the media content item. In a more particular example, process 300 can be associated with a service, such as a video hosting service and/or video sharing service, and the media content item can be a video that is uploaded by a user of the service.

As another example, the media content item can be received from a media content hosting service and/or a media content sharing service which may or may not be associated with a device executing process 300. In a more particular example, process 300 can receive one or more media content items from the media content hosting service and/or media content sharing service in order to associate that media content with location information and/or with map information.

As yet another example, process 300 can receive identifying information of a media content item that has already been received and/or is stored by a device executing process 300 and/or a device associated with a device executing process 300. In a more particular example, process 300 can receive a uniform resource locator (URL) that can be used to access the media content item, an identification number assigned to the media content item, and/or any other suitable identifying information of the media content item. Such identifying information can be received as the result of user input at a user device (e.g., a user can specify one or more content items, select a link to one or more content items, etc.). Additionally or alternatively, identifying information can be specified programmatically, such as in cases where process 300 is to be performed for a particular group of media content items (e.g., content items in a database, content items in a database that meet certain criteria, content items in a playlist of content items, etc.).

At 304, process 300 can determine if there is location metadata associated with the media content received and/or identified at 302. Note that, prior to determining if there is location metadata associated with the media content (and/or executing any other portion of process 300 described below), process 300 can require user authorization to proceed. For example, process 300 can require a user to verify their identify and that the user wishes to proceed with generating location data that is to be used to associate the received media content item with map information for display to one or more other users. In some embodiments, location metadata can include any suitable information such as coordinates, altitude, direction (e.g., compass direction), and/or any other suitable information. Additionally, in some embodiments, the location metadata can include information that indicates a range for the location metadata (e.g., an indication that the coordinates are accurate to a particular number of meters) and/or that indicates that a particular technique (e.g., Global Positioning System (GPS) techniques, techniques based on data from an altimeter sensor, multilateration techniques, techniques based on user input, techniques based on data from an electronic compass, etc.) was used to determine the location metadata.

In some embodiments, process 300 can use any suitable technique or combination of techniques to determine whether location metadata is associated with the media content item received and/or identified at 302. For example, process 300 can determine if any metadata that is received with the media content is consistent with being location metadata (e.g., based on the format of the metadata, based on identifying information of the metadata, etc.). As another example, process 300 can determine if there is metadata stored in association with the media content that is consistent with being location metadata. Note that in some embodiments, process 300 can determine if there is location metadata that is associated with particular times in the media content (e.g., not a single location that is associated with the entire media content item).

In some embodiments, location metadata can be associated with one or more portions of the media content item, while other portions of the media content may not be associated with location metadata. For example, in some embodiments, certain scenes in a video can be associated with location metadata, while other scenes in the video are not associated with location metadata. In a more particular example, a creator of the video can include location metadata for scenes that are recorded at a particular location, while the creator of the video may consciously skip (e.g., by not creating the metadata, by removing the metadata, etc.) including location metadata for scenes in the video that are recorded at a production studio.

As another example, a creator of a video can control which portions of a video are associated with location metadata while the video is being recorded and/or during post recording processing. In a more particular example, a creator of the video can selectively control whether location information (e.g., GPS information, multilateration information, etc.) is recorded and associated with the video as metadata during recording of the video. In another more particular example, a creator of the video can selectively remove location metadata from portions of the video using any suitable technique or combination of techniques.

If process 300 determines that there is location metadata associated with the received and/or identified media content ("YES" at 304), process 300 can move to 306. At 306, process 300 can generate location information for one or more scenes in the media content based on the location metadata associated with the media content. Process 300 can use any suitable technique or combination of techniques to generate location information for the one or more scenes based on the location metadata. For example, process 300 can extract the location metadata and generate location information for one or more portions of the media content. In such an example, location metadata can include raw data (e.g., coordinates at particular times), and the generated location information can use the raw data to generate location information which may or may not synthesize and/or otherwise treat the raw data to generate the location information. In a more particular example, process 300 can extract raw location information such as coordinates from the metadata, and can use the coordinate data to map out a path for the media content. In another more particular example, process 300 can extract raw location information such as coordinates from the metadata, and can generate location information by determining likely coordinates based on the measured coordinates, which may have been recorded inaccurately. Additionally or alternatively, in some embodiments, process 300 can omit generating location information and the location metadata can be used as location information.

In some embodiments, the location metadata can include direction information that is associated with a particular time. Process 300 can use such direction information to determine a likely field of view for image data included in the media content. This can be used, for example, to determine which areas corresponding to map locations are likely to be included in the media content item. In a more particular example, process 300 can generate location information corresponding to the location and direction from which a particular scene in a video was recorded based on location metadata.

In some embodiments, the location information generated by process 300 can include multiple locations that each correspond to one or more portions of the media content item. For example, the location information can include location information for different scenes in the media content and/or location information that changes corresponding to camera movement within a scene.

At 308, process 300 can determine if the location information is to be edited and/or updated. Process 300 can use any suitable technique or combination of techniques to determine if the location information is to be edited and/or updated. For example, process 300 can determine if user input requesting that the location information be edited and/or updated has been received (e.g., from a user interface presenting the location information that was generated based on location metadata). As another example, process 300 can determine if the location information generated at 306 was incomplete (e.g., based on a comparison of location metadata and location information) or is likely to be inaccurate (e.g., based on the determined or inferred accuracy of the location metadata). If process 300 determines that the location information is likely to be incomplete and/or inaccurate, process 300 can determine that the location information is to be edited and/or updated. As yet another example, process 300 can determine that the location information is to be edited and/or updated based on user preferences indicating that upon generating location information, the location information is to be presented for editing and/or updating.

If process 300 determines that the location information is to be edited and/or updated ("YES" at 308), process 300 can move to 310. Otherwise, if process 300 determines that the location information is not to be edited and/or updated ("NO" at 308), process 300 can move to 314 and can save the location information in association with the media content item as described below in connection with 314.

Returning to 304, if process 300 determines that location metadata is not associated with the media content ("NO" at 304), process 300 can move to 310. At 310, process 300 can receive location data that is to be used to associate location information with the received and/or identified media content item. In some embodiments, the location data received at 310 can be received using any suitable technique or combination of techniques, and can be received in any suitable format. For example, in some embodiments, the location data can be received from a user device that is being used to access process 300. In a more particular example, the location data can be received as a document (e.g., a text document, a spreadsheet, etc.) relating times in the media content to location data (e.g., a table of times within the media content and corresponding location data for that time). In another more particular example, the location data can be received as a document relating times at which portions of the media content were recorded to location data (e.g., a table of times at which media content was recorded and corresponding location data for that time).

In yet another more particular example, the location data can be received from a source specified by the user device. In such an example, the user device can specify a uniform resource locator (URL) (and/or any other suitable source) from which process 300 can retrieve location data that is to be used to generate location information for the media content.

As another example, the location data can be received from a source other than the user device. In a more particular example, process 300 can receive location data of the user device that was used to record the media content (e.g., such as a smartphone, a tablet computer, etc.) corresponding to particular times during which the media content was recorded. In such an example, the location data can, in some cases, be location data that was automatically recorded by a service provider associated with the user device based on settings associated with the user device. In some embodiments, prior to accessing and/or using such location data, process 300 and/or any other suitable process) can require that a user authenticate their identity (e.g., by entering a username and/or password, by providing biometric information, by two-factor authentication, etc.) prior to allowing access to and/or use of the location data.

In situations in which the mechanisms described herein collect personal information about users, or can make use of personal information, the users can be provided with an opportunity to control whether programs or features collect user information (e.g., location data), or to control whether and/or how the user information is used (e.g., the users can explicitly request that the user information be collected, used, etc.). For example, process 300 can request user input prior to generating location information based on received location data and/or location metadata. Such user input can specify a level of detail at which the location information is generated. In a more particular example, process 300 can cause a user interface for selecting whether to generate the location information as coordinates with compass direction, coordinates, general location (e.g., a neighborhood, a city, etc.), and/or at any other suitable level of generality. In addition, certain data can be treated in one or more ways before it is stored or used, so that personal information is removed. For example, location information can be generalized such that an accurate location of the user device is not stored.

As yet another example, in some embodiments, the location data can be received based on user input specifying location data to be associated with a particular portion of media content. In a more particular example, such location data can be provided by user selection of a location on a map that is cause by process 300 to be presented by a user device in association with the media content. In such an example, a user can specify a location at which a portion of the media content that is currently being presented was recorded.

At 312, process 300 can generate location information for the media content based on the received location data. Process 300 can use any suitable technique or combination of techniques to generate the location information from the received location data. For example, techniques described above in connection with 306 can be used to generate location information from the location data.

At 314, process 300 can save the generated location information in association with the media content. In some embodiments, process 300 can save the generated location information using any suitable technique or combination of techniques. For example, the generated location information can be associated with the media content item as metadata. As another example, the generated location information can be stored in a database (and/or other suitable data structure) in association with identifying information of the media content item, such that the location information can be accessed based on identifying information and/or such that the media content item can be identified based on the saved location information.

In some embodiments, the content item received at 302 can already be associated with saved location information. In such embodiments, process 300 can determine if the location information is to be edited and/or updated. If the location information is to be edited and/or updated (e.g., based on user input, based on user preferences, and/or based on any other suitable factor), process 300 (and/or any other suitable process) can present a user interface for editing and/or updating the location information (which can be similar to examples described above in connection with 310).

Figure 4:
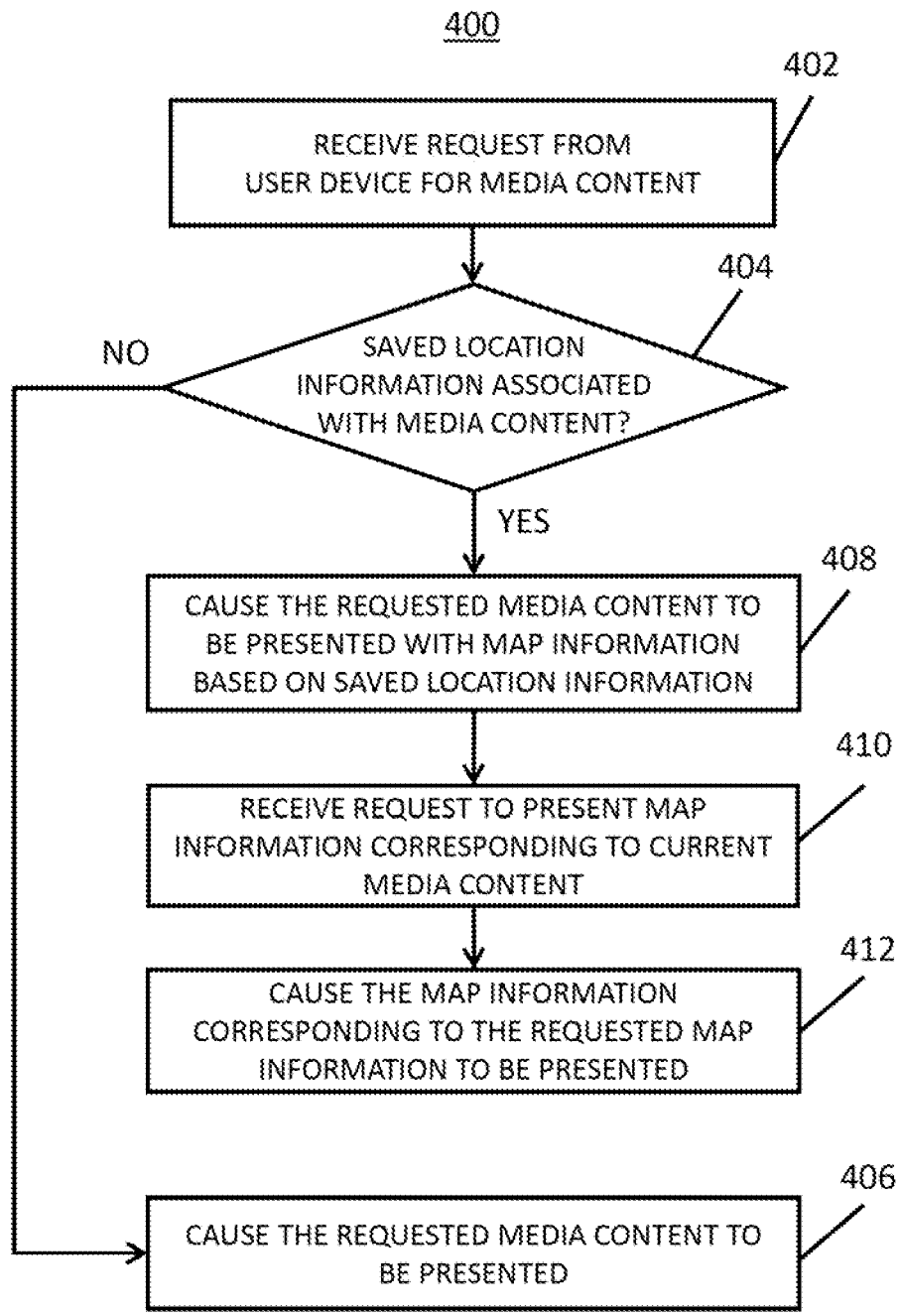
FIG. 4 shows an example of a process for presenting a media content item in association with map information corresponding to location information of the media content in accordance with some embodiments of the disclosed subject matter.

FIG. 4 shows an example 400 of a process for presenting a media content item in association with map information corresponding to location information of the media content in accordance with some embodiments of the disclosed subject matter. At 402, process 400 can receive a request for a media content item. Process 400 can receive the request using any suitable technique or combination of techniques and the request can be received from any suitable device. For example, the request can be received from a user device executing a browser application, a media content presentation application, and/or any other suitable application. In some embodiments, a device that is requesting the media content can be different than a device that is to present the media content (e.g., when a first user device such as a smartphone, tablet computer, personal computer, etc., requests that one or more content items be presented by a second user device such as a media receiving device, a set-top box, etc.).

In some embodiments, process 400 can determine if the request is from a user device that has a relatively large format display (and/or whether the media content it to be presented by such a user device) such as a television, a computer monitor, a tablet computer, etc. Additionally or alternatively, in some embodiments, process 400 can determine if the request is from an application that is associated with user devices with relatively large displays (e.g., a desktop version of a browser application, a tablet version of a content presentation application, etc.), or with relatively small displays (e.g., a mobile version of a browser application, a smartphone version of a content presentation application, etc.). If process 400 determines that the media content is to be presented by a user device with a relatively small format display (such as a smartphone), process 400 can cause the requested media content to be presented by the user device without executing the remainder of process 400. In some embodiments, if process 400 initially determines that the requested media content is to be presented by the user device without executing the remainder of process 400, process 400 can determine that the remainder of process 400 is to be executed if the user device being used to present the requested media content changes to a user device with a larger format display.

Alternatively, in some embodiments, process 400 can proceed to 404 regardless of what type of device is to present the media content, regardless of a relative size of the display, and/or regardless of the type of application used to request the content for presentation.

At 404, process 400 can determine if there is saved location information that is associated with the media content item requested at 402. Process 400 can use any suitable technique or combination of techniques to determine if there is saved location information that is associated with the requested media content item. For example, process 400 can determine if location information is saved in association with the content item as metadata. Note that, in some embodiments, process 400 can use location metadata described above in connection with 304 as saved location information. As another example, process 400 can determine if location information is stored in a database (and/or any other suitable data structure) in association with the requested content item (and/or with identifying information of the requested content item).

If process 400 determines that there is no saved location information associated with the requested media content item ("NO" at 404), process 400 can move to 406. At 406, process 400 can cause the requested media content item to be presented by the device that requested the media content without presenting map information in association with the media content.

Otherwise, if process 400 determines that there is saved location information associated with the requested media content item ("YES" at 404), process 400 can move to 408. At 408, process 400 can cause the requested media content to be presented in association with map information based on the saved location information. In some embodiments, process 400 can cause the associated map information to be presented using any suitable technique or combination of techniques, and in any suitable format. For example, as described below in connection with FIG. 6, process 400 can cause the map information to be presented as a link or a relatively small version of the map information overlaid on the media content during presentation. As another example, process 400 can cause the map information to be presented in a separate user interface presented in association with presentation of the media content (e.g., in a window or frame adjacent to a window or frame being used to present the media content). As yet another example, process 400 can cause the map information to be presented on a second screen device (e.g., a smartphone, a tablet computer, a personal computer, a laptop computer, etc.) during presentation of the media content by a first screen device (e.g., a television, a set-top box, a personal computer, a laptop computer, etc.).

In some embodiments, the map information can be presented using any suitable technique or combination of techniques. For example, the map information can be presented as a portion of a street map that represents a location associated with the currently presented media content. As another example, the map information can be presented as a portion of an image of an aerial view of a landscape (e.g., a satellite image) associated with a location associated with the currently presented media content. As yet another example, the map information can be presented as a portion of one or more images of the area around a location associated with the currently presented media content (e.g., as recorded by a camera near ground level). As still another example, the map information can be presented as a link to other map information (e.g., a street map, a satellite image, a ground level image, etc.) that is available for presentation. As a further example, the map information can be presented as any suitable combination of different types of map information. In some embodiments, as the location information associated with the media content changes during presentation of the media content (e.g., when the scene depicted in a video changes), the map information can be updated to present map information corresponding to the new location information.

In some embodiments, process 400 can provide a user with an opportunity to control whether map information is presented during presentation of media content. For example, a user interface for presenting the media content can include a user interface element for toggling presentation of the map information. As another example, a user interface for presenting the media content can include a user interface for changing settings associated with presenting the media content, such as whether to present map information corresponding to location information associated with the media content being presented.

At 410, process 400 can receive a request to present the map information corresponding to a portion of the media content that is currently being presented. In some embodiments, such a request can be received as a result of any suitable activity. For example, the request can be transmitted by a user device in response to user input selecting the map information presented in association with the media content. As another example, the request can be generated in response to a first user device (such as a second screen device) causing the media content to be presented by a second user device (e.g., a television, a set-top box, etc.). Additionally, the request can be received using any suitable technique or combination of techniques, and can be received in any suitable format.

At 412, process 400 can cause map information corresponding to the requested map information to be presented by a user device associated with the request for map information. In some embodiments, process 400 can cause the map information to be presented at 412 in any suitable format and/or using any suitable technique or combination of techniques. For example, in some embodiments, the map information can be presented in a larger format than the format in which it was being presented during presentation of the media content at 408. In a more particular example, process 400 can cause the map information to be opened in a new browser window. In another more particular example, process 400 can cause the portion of a user interface used to present map information to expand in size, while causing a portion of the user interface used to present media content to contract in size. As another example, the map information can be presented in a different format than a format in which it was presented during presentation of the media content at 408. In a more particular example, if process 400 causes the map information to be presented as one or more links at 408, process 400 can cause the map information to be presented as a street map at 412. In another more particular example, if process 400 causes the map information to be presented as a street map at 408, process 400 can cause the map information to be presented as one or more images captured near ground level at 412. In yet another more particular example, if process 400 causes the map information to be presented in a first format (a street map, one or more aerial images, one or more images captured near ground level, etc.) at 408, process 400 can cause the map information to be presented in a second format at 412 that combines one or more formats (e.g., a street map and one or more images captured near ground level, a street map and one or more aerial images of an area represented in the street map, etc.). In some embodiments, process 400 can continue to cause the media content to be presented during presentation of the map information. Additionally or alternatively, presentation of the media content can be paused or otherwise inhibited during presentation of the map information.

In some embodiments, upon presenting the map information, process 400 (and/or any other suitable process, such as process 500 described below in connection with FIG. 5) can cause representations of media content associated with locations represented in the map information to be presented in the map information.

Figure 5:
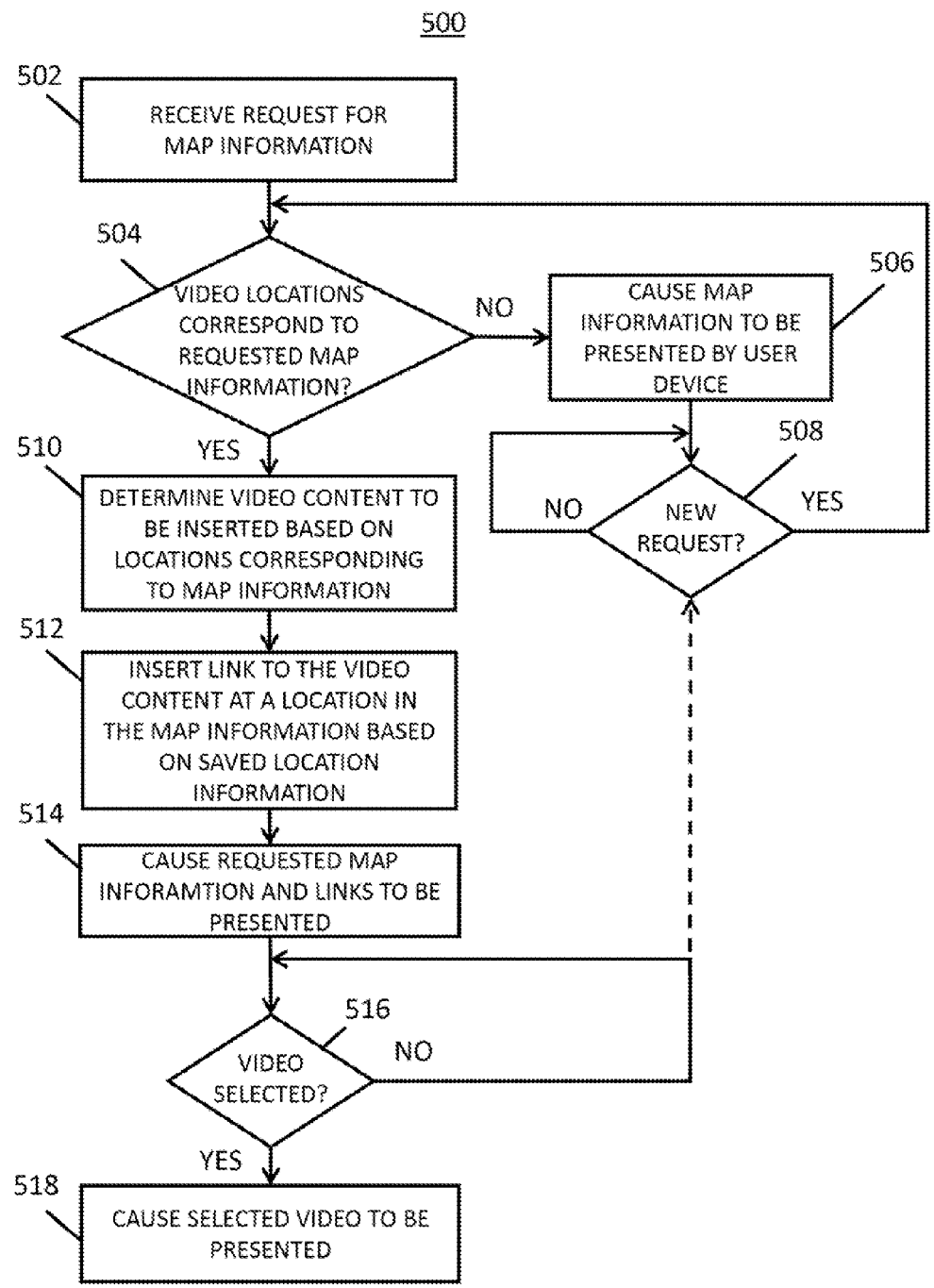
FIG. 5 shows an example of a process for presenting map information in association with media content having saved location information that corresponds to a portion of the presented map information in accordance with some embodiments of the disclosed subject matter.

FIG. 5 shows an example 500 of a process for presenting map information in association with media content having saved location information that corresponds to a portion of the presented map information in accordance with some embodiments of the disclosed subject matter. At 502, process 500 can receive a request for map information. Process 500 can receive the request using any suitable technique or combination of techniques and the request can be received from any suitable device. For example, the request can be received from a user device executing a browser application, a map presentation application, and/or any other suitable application. In some embodiments, a device that is requesting the map information can be different than a device that is to present the map information (e.g., when a first user device such as a smartphone, tablet computer, personal computer, etc., requests that map information be presented by a second user device such as a media receiving device, a set-top box, etc.).

At 504, process 500 can determine if there is saved location information associated with any media content items that corresponds to the requested map information. Process 500 can use any suitable technique or combination of techniques to determine if there is saved location information associated with media content that corresponds to the requested map information. For example, process 500 can query a database of saved location information associated with media content items to determine if any saved location information corresponds to one or more points within the requested map information. As another example, process 500 can query a search engine to determine whether location information associated with a media content item exists corresponding to the requested map location.

In some embodiments, process 500 can determine whether to execute 504 based on one or more factors. For example, in some embodiments, process 500 can determine that 504 is to be executed if the web page and/or application being used to access the map information is in a particular mode or state. In a more particular example, a web page and/or application that can be used to present map information can include a setting and/or mode selection user interface that can allow a user to specify whether media content having associated location information is to be presented in a map when the location information corresponds to the requested map information. Such a mode can be similar to a mode selection for specifying whether traffic information is to be presented in the map information that is being presented, in some embodiments. Additionally or alternatively, if the web page and/or application is being executed in a mode in which media content with location information corresponding to the requested map information is not to be presented, process 500 can determine, at 504, that there is not media content having associated location information corresponding to the requested map information.

If process 500 determines that there is not saved location information associated with media content items that corresponds to the requested map information ("NO" at 504"), process 500 can move to 506. At 506, process 500 can cause the requested map information to be presented. Process 500 can cause the requested map information to be presented using any suitable technique or combination of techniques. For example, process 500 can transmit the requested map information to a user device associated with the request. In such an example, a suitable application (e.g., a browser application, a map application, etc.) being executed by the user device can present the requested content. As another example, process 500 can cause map information stored locally by a user device to be presented in response to the request for map information.

At 508, process 500 can determine if a request for new map information has been received. In some embodiments, a request for new map information can be sent in response to any suitable action at a user device and/or at a device executing process 500. For example, a user device can send a request for new map information based on user input to change which information is presented by the map, such as user input to zoom in or out, user input to drag the map to show a different area, user input to perform a search, user input to present more or less information (e.g., traffic information, media content with location information associated with locations represented in the presented map information, etc.), etc.

If process 500 determines that a request for new map information has not been received ("NO" at 508), process 500 can return to 508 to continue to determine if a request for new map information has been received. Otherwise, if process 500 determines that a request for new map information has been received ("YES" at 508), process 500 can return to 504 to determine if there is saved location information associated with any media content items that corresponds to the newly requested map information.

If process 500 determines at 504 that there is saved location information associated with media content items that corresponds to the requested map information ("YES" at 504"), process 500 can move to 510. At 510, process 500 can determine media content items that are to be inserted into the map information based on the location information associated with at least a portion of the media content item corresponding to the requested map information. Process 500 can use any suitable technique or combination of techniques to determine which among the media content having location information corresponding to the requested map information is to be presented. For example, process 500 can determine that media content that is not accessible by a user associated with a user device that requested the map information is not to be inserted into the map information. In a more particular example, media content that is designated as private by a creator and/or owner of the media content can be inhibited from being inserted into the map information unless the user associated with the user device that requested the map information is allowed to access the private media content (e.g., because the user is a social connection of the content creator and/or owner). In another more particular example, certain media content may be restricted to user's that own, buy, rent or subscribe to a particular service in order to consume the media content. Process 500 can inhibit media content which the user cannot access based on the restrictions in such an example from being inserted into the map information. Alternatively, in some embodiments, process 500 can cause media content which the user cannot access based on the restrictions in such an example to be presented, when inserted, with information indicating how the user can access the content (e.g., by buying the content, renting the content, subscribing to a particular service, etc.).

As another example, process 500 can select media content that is relatively more popular and/or that is relatively rapidly increasing in popularity for insertion into the map information than is media content that is relatively less popular and/or that is not relatively rapidly increasing in popularity.

As yet another example, process 500 can select media content created and/or owned by a social connection of a user of the user device that requested the map information for insertion into the map information. A social connection of the user can be, for example, another user that is mutually connected (e.g., as a "friend" or "connection") to the user on a social networking service, another user that the user follows on a social networking or other service (e.g., as a subscriber to the social connection's content), another user that the user corresponds with (e.g., by email, text messages, chat, etc.), etc.

As still another example, process 500 can select media content that a user of the user device that requested the map information is more likely to enjoy can is more likely for insertion into the map information. For example, process 500 can determine which media content from among the media content having location information corresponding to the requested map information is more likely to be interesting to the user based on the user's preferences. In some embodiments, user preferences can be explicitly provided by a user and/or can be determined based on the media content that the user consumes and/or enjoys (e.g., based on consuming the media content to completion, based on user actions indicating enjoyment and/or interest, etc.). For example, based on the media content that the user consumes, the user can be grouped with other users that consumed similar media content. In such an example, which content the user is more likely to enjoy can be determined based on which media content other users in the group have enjoyed and/or characteristics of the media content that the user and/or other users in the group have enjoyed. In situations in which the mechanisms described herein collect personal information about users, or can make use of personal information, the users can be provided with an opportunity to control whether programs or features collect user information (e.g., information about user preferences, media content consumption history, etc.), or to control whether and/or how to information about user requests for content are used. In addition, certain data can be treated in one or more ways before it is stored or used, so that personal information is removed. For example, a user's identity can be treated so that no personal information can be determined for the user. Thus, the user can have control over how information is collected about the user and used by a device executing process 500 (and/or any other suitable process).

In some embodiments, process 500 can determine which media content to insert into the map information that is to be presented based on a relevance score. Such a relevance score can be calculated based on scores corresponding to one or more of the examples described above, and a subset of relevant media content can be selected for insertion into the map information. Additionally, in some embodiments, process 500 can provide a user with an opportunity to control which types of media content items are inserted into the map information (e.g., media content created by and/or owned by social connections of the user, media content that the user can access, more and/or different media content than what is initially presented, etc.).

At 512, process 500 can insert one or more links to the selected media content items at locations in the requested map information based on the saved location information. In some embodiments, process 500 can use any suitable technique or combination of techniques to insert representations of the media content items into the map information. For example, process 500 can cause an image representative of the media content (or portion of the media content) associated with a particular location to be presented in proximity to that location. As another example, process 500 can cause a link to the media content to be inserted into the map information at a location that is near to a location which is associated with the media content (or a portion of the media content). As yet another example, process 500 can cause descriptive information about the media content to be inserted into the map information at a location that is near to a location which is associated with the media content (or a portion of the media content), such as a title, information about a creator and/or owner of the content, information about one or more actors appearing in the content, etc.

In some embodiments, process 500 can determine a location in the map information at which the representation of the media content is to be inserted using any suitable technique or combination of techniques. For example, process 500 can determine that the location at which the representation of the media content is to be inserted is an initial location associated with a particular portion of the media content (e.g., an initial location after an abrupt change in the location information associated with the media content). As another example, process 500 can determine that the location at which the representation of the media content is to be inserted is a location that is associated with a particular portion of the media content for a relatively long time.

At 514, process 500 can cause the requested map information with the inserted links of the selected media content to be presented. In some embodiments, process 500 can use any suitable technique or combination of techniques to present the map information with the inserted representations of media content. For example, in some embodiments, process 500 can cause the map information with inserted representations of media content to be presented as described with reference to FIG. 7. As another example, process 500 can cause the map information to be presented with a listing of media information that is inserted into the map information and/or with points in the map shown as having media content associated with that point. In such an example, the list and/or points can be presented similarly to the results of a search for one or more points of interest in the map.

At 516, process 500 can determine if a representation of a media content item has been selected. In some embodiments, such a selection can be conveyed by a user device in response to any suitable input, such as a selection of a particular representation using a selecting device (e.g., a mouse, a trackpad, etc.), selection by touching a touchscreen at a location corresponding to a position in the map at which a representation is being presented, etc.

If process 500 determines that a link to the media content has not been selected ("NO" at 516), process 500 can continue to determine if a link has been selected. Note that in some embodiments, process 500 can also move to 508 to determine if a new request for map information has been received.

Note that, although blocks 508 and 516 are described herein as process 500 making a determination, these blocks (and/or any other suitable blocks described herein) can be configured as asynchronous processes that are invoked when particular input is supplied such that process 500 need not repeatedly actively check to determine whether a new request for map information has been received.

Otherwise, if process 500 determines that a representation of the media content has been selected ("YES" at 516), process 500 can move to 518. At 518, process 500 can cause the selected media content item to be presented. In some embodiments, the selected media content can be presented using any suitable technique or combination of techniques. For example, the selected media content can be presented using a new window or other user interface. As another example, the media content can be presented using a player embedded in a user interface used to present the map information.

In some embodiments, the selected media content can be presented from any suitable point within the media content. For example, the selected media content can be presented starting from a point in the selected media content that was recorded at the location at which the selected representation of the media content was presented in the map information. As another example, the selected media content can be presented starting from a point in the selected media content corresponding to the beginning of a scene that includes the point that was recorded at the location at which the selected representation of the selected media content was presented in the map information. As yet another example, the selected media content can be presented from a beginning of the selected media content item.

Figure 6:
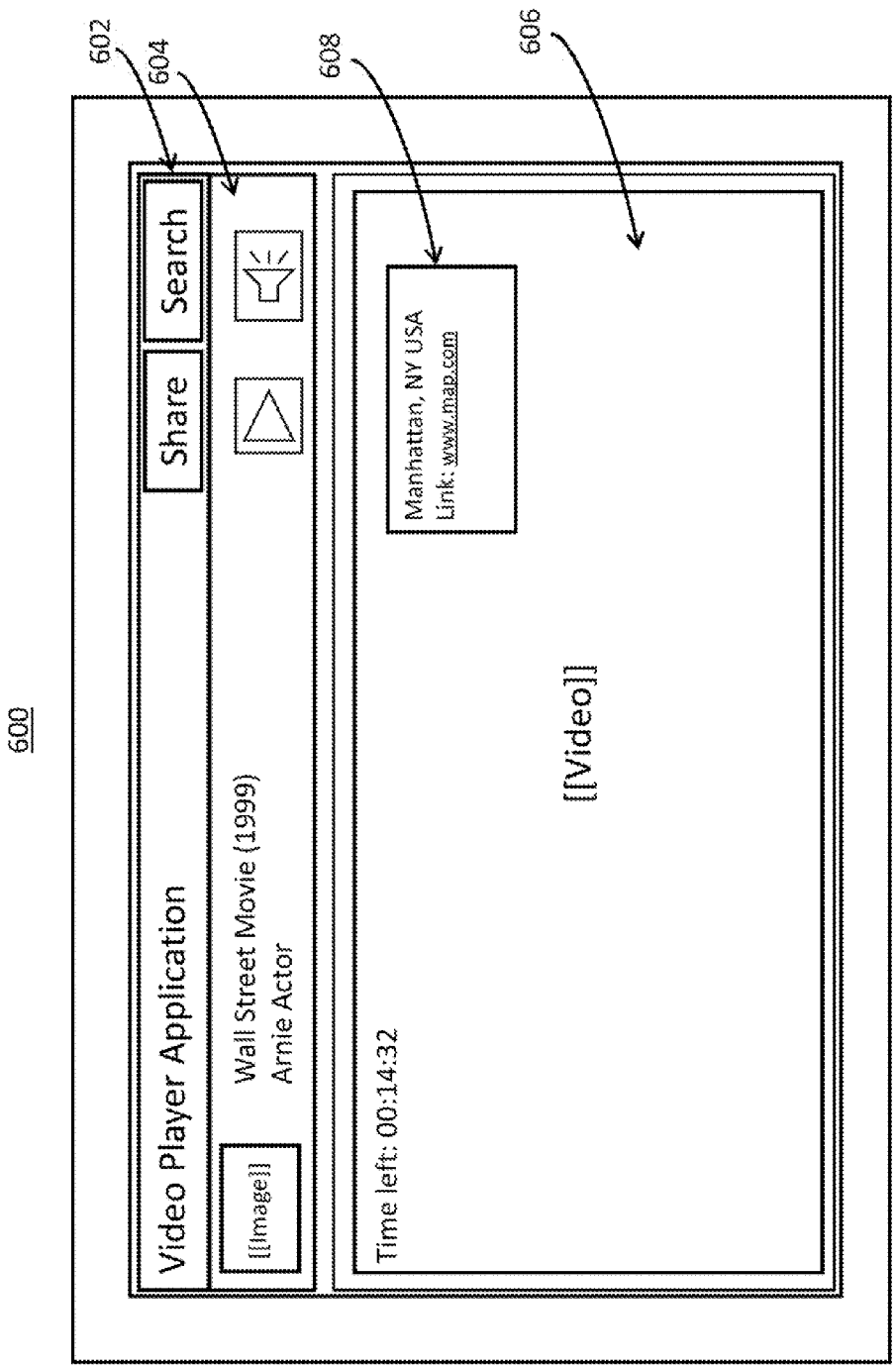
FIG. 6 shows an example of a user interface for presenting a media content item with associated map information in accordance with some embodiments of the disclosed subject matter.

FIG. 6 shows an example 600 of a user interface for presenting a media content item with associated map information in accordance with some embodiments of the disclosed subject matter. As shown in FIG. 6, in some embodiments, user interface 600 can include a portion 602 that includes, for example, information indicating an application that is currently being used to present content, a user interface element for sharing the media content item currently being presented, a user interface element for initiating a search, etc.

In some embodiments, user interface 600 can include a video portion 604 that includes, for example, information that indicates which media content item is currently being presented (e.g., a title of the media content item, a creator and/or owner of the media content item, one or more cast members appearing in the media content item, etc.), a user interface element for playing/pausing presentation of the media content, a user interface element for controlling a volume at which the media content item is being presented, etc.

In some embodiments, user interface 600 can include a video presentation portion 606, which can present a media content item that was requested for presentation (e.g., as described in connection with 402 of FIG. 4). In some embodiments, user interface 600 can include map information 608 corresponding to saved location information associated with a portion of the media content that is currently being presented using video presentation portion 606. As shown in FIG. 6, the map information includes descriptive information about the saved location information and a link to map information depicting the saved location. However, as described above in connection with 408 of FIG. 4, any suitable map information can be presented as map information 608. As described above in connection with 410 of FIG. 4, selection of map information 608 and/or a link presented with map information 608 can cause map information depicting the saved location to be presented by a user device presenting user interface 600 and/or a second screen device associated with a user device presenting user interface 600.

Figure 7:
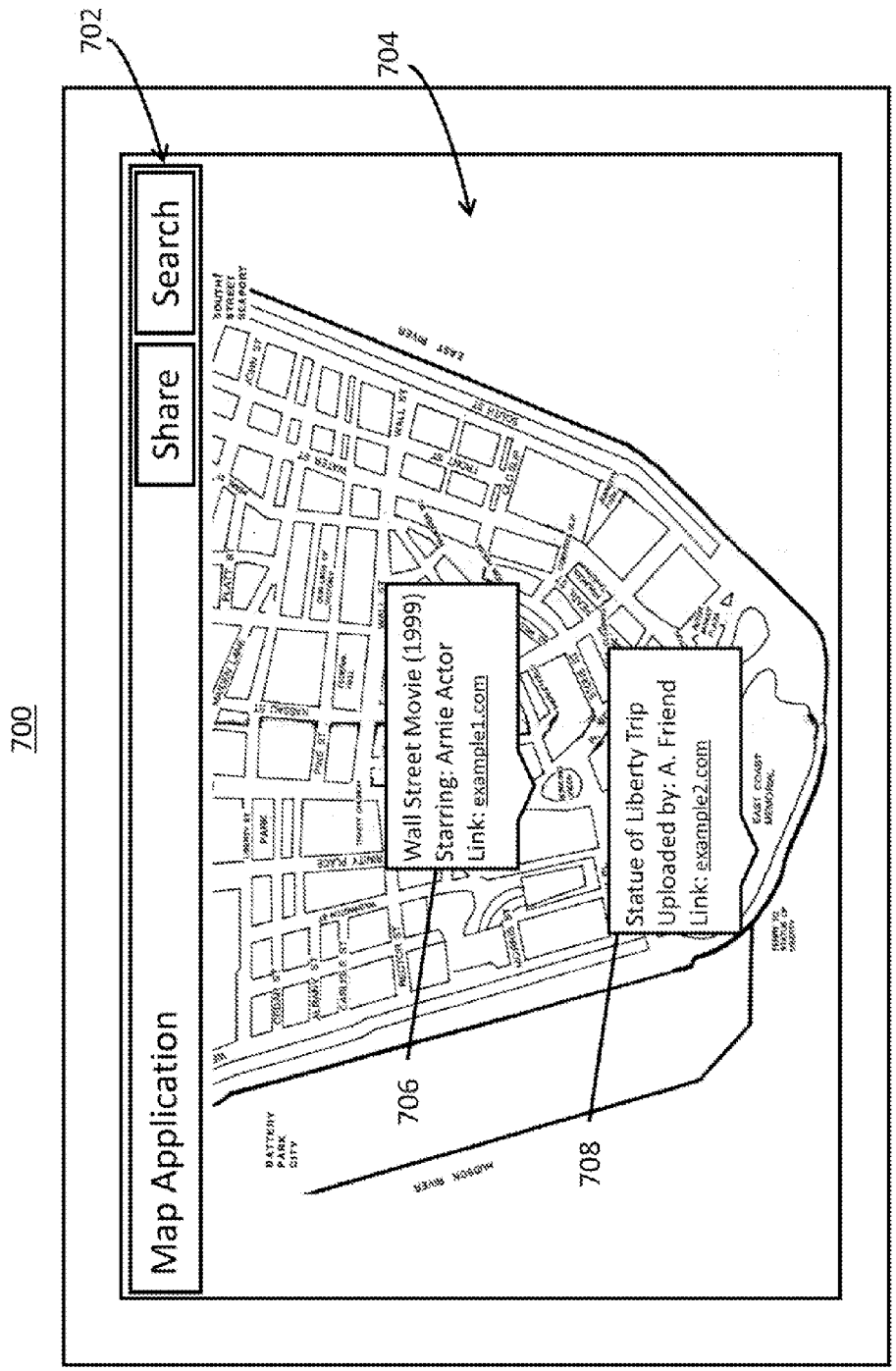
FIG. 7 shows an example of a user interface for presenting map information with associated media content items in accordance with some embodiments of the disclosed subject matter.

FIG. 7 shows an example 700 of a user interface for presenting map information with associated media content items in accordance with some embodiments of the disclosed subject matter. As shown in FIG. 7, in some embodiments, user interface 700 can include a portion 702 that includes, for example, information indicating an application that is currently being used to present map information, a user interface element for sharing the map information, a user interface element for initiating a search, etc.

In some embodiments, user interface 700 can include a map presentation portion 704 in which map information can be presented. For example, as shown in FIG. 7, a street map representing a portion of New York City is presented using map presentation portion 704.

In some embodiments, user interface 700 can include representations of media content 706 and 708. For example, representation 706 can represent a movie with a scene that was filmed at a location corresponding to a portion of the map presented using map presentation portion 704. In such an example, representation 706 can include any suitable descriptive information about the movie, such as a title (e.g., "Wall Street Movie"), a year when the movie was released (e.g., 1999), one or more cast members appearing in the movie (e.g., "Arnie Actor"), a link to a web page (or other suitable destination, such as an application) where the movie can be watched (or downloaded, rented, etc.). As another example, representation 708 can represent a video recorded by a social connection of a user associated with the user device presenting user interface 700. In such an example, representation 708 can include any suitable descriptive information about the video, such as a title (e.g., "Statue of Liberty Trip"), identifying information of a creator and/or owner of the media content (e.g., "A. Friend"), a link to a web page (or other suitable destination, such as an application) where the video can be watched, etc.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 212 and/or hardware processor 222) to execute the mechanisms described herein. For instance, these mechanisms can encompass a computer program written in a programming language recognizable by user device 110, and/or server 102 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about content that is being requested by user device 110, information about requests for content from user device 110 stored on a remote device such as server 102, etc.), or to control whether and/or how to information about user requests for content are used. In addition, certain data can be treated in one or more ways before it is stored or used, so that personal information is removed. For example, a user's identity can be treated so that no personal information can be determined for the user, or a user's geographic location can be generalized where location information is obtained (such as to a city, ZIP code, or state level), so that a particular location of a user cannot be determined. Thus, the user can have control over how information is collected about the user and used by the mechanisms described herein.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 3-5 can be executed or performed in any order or sequence not limited to the order and sequence shown and described in the figures. Also, some of the above steps of the processes of FIGS. 3-5 can be executed or performed substantially simultaneously where appropriate or in parallel to reduce latency and processing times. Furthermore, it should be noted that FIGS. 3-5 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for associating scenes depicted in media content with a map of where the media content was produced are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting map information with video information, the method comprising:
    receiving, using a hardware processor, a request for a video from a user device;
    determining if there is location information associated with one or more portions of the video;
    in response to determining that there is location information associated with one or more portions of the video, causing first map information corresponding to the location information to be presented in a first format during presentation of the video, wherein the first format presents the first map information as a portion of a street map that includes a representation of an area corresponding to the location information;
    receiving an indication that the first map information has been selected;
    in response to receiving the indication that the first map information has been selected, causing second map information to be presented by the user device such that the location information corresponding to the portion of the video that was being presented when the indication was received is included in the second map information, wherein the second map information is presented in a second format that is different than the first format and wherein the second format presents the second map information as including one or more images associated with the area represented in the street map from the first map information.

2. The method of claim 1, wherein the location information is stored in a database, and wherein the method further comprises querying the database for location information associated with the video.

3. The method of claim 1, wherein the first map information further comprises an image captured near ground level that depicts at least a portion of an area corresponding to the location information.

4. The method of claim 1, wherein causing the first map information to be presented during presentation of the video comprises causing the first map information to be presented in a user interface area adjacent to a user interface area used to present the video.

5. The method of claim 1, wherein causing the first map information to be presented during presentation of the video comprises causing the first map information to be presented in a user interface area that overlaps at least a portion of a user interface area used to present the video.

6. The method of claim 1, further comprising causing the first map information to change during presentation of the video to reflect location information associated with a portion of the video that is currently being presented.

7. The method of claim 6, wherein the second map information corresponds to the first map information that was being presented when the indication that the first map information was selected was received.

8. The method of claim 1, further comprising inhibiting presentation of the first map information during portions of the video that are not associated with location information.

9. A system for presenting map information with video information, the system comprising:
    a memory; and
    a hardware processor that, when executing computer executable instructions stored in the memory, is configured to:
        receive a request for a video from a user device;
        determine if there is location information associated with one or more portions of the video;
        in response to determining that there is location information associated with one or more portions of the video, cause first map information corresponding to the location information to be presented in a first format during presentation of the video, wherein the first format presents the first map information as a portion of a street map that includes a representation of an area corresponding to the location information;
        receive an indication that the first map information has been selected;
        in response to receiving the indication that the first map information has been selected, cause second map information to be presented by the user device such that the location information corresponding to the portion of the video that was being presented when the indication was received is included in the second map information, wherein the second map information is presented in a second format that is different than the first format and wherein the second format presents the second map information as including one or more images associated with the area represented in the street map from the first map information.

10. The system of claim 9, wherein the location information is stored in a database, and wherein the hardware processor is further configured to query the database for location information associated with the video.

11. The system of claim 9, wherein the first map information further comprises an image captured near ground level that depicts at least a portion of an area corresponding to the location information.

12. The system of claim 9, wherein causing the first map information to be presented during presentation of the video comprises causing the first map information to be presented in a user interface area adjacent to a user interface area used to present the video.

13. The system of claim 9, wherein causing the first map information to be presented during presentation of the video comprises causing the first map information to be presented in a user interface area that overlaps at least a portion of a user interface area used to present the video.

14. The system of claim 9, wherein the hardware processor is further configured to cause the first map information to change during presentation of the video to reflect location information associated with a portion of the video that is currently being presented.

15. The system of claim 14, wherein the second map information corresponds to the first map information that was being presented when the indication that the first map information was selected was received.

16. The system of claim 9, wherein the hardware processor is further configured to inhibit presentation of the first map information during portions of the video that are not associated with location information.

17. A non-transitory computer-readable medium containing computer executable instructions that, when executed by a processor, cause the processor to perform a method for presenting map information with video information, the method comprising:

receiving a request for a video from a user device;

determining if there is location information associated with one or more portions of the video;

in response to determining that there is location information associated with one or more portions of the video, causing first map information corresponding to the location information to be presented in a first format during presentation of the video, wherein the first format presents the first map information as a portion of a street map that includes a representation of an area corresponding to the location information;

receiving an indication that the first map information has been selected;

in response to receiving the indication that the first map information has been selected, causing second map information to be presented by the user device such that the location information corresponding to the portion of the video that was being presented when the indication was received is included in the second map information, wherein the second map information is presented in a second format that is different than the first format and wherein the second format presents the second map information as including one or more images associated with the area represented in the street map from the first map information.

* * * * *